US008841785B2

(12) United States Patent
Theuss et al.

(10) Patent No.: US 8,841,785 B2
(45) Date of Patent: Sep. 23, 2014

(54) ENERGY HARVESTER

(75) Inventors: Horst Theuss, Wenzenbach (DE); Klaus Elian, Alteglofsheim (DE)

(73) Assignee: Infineon Technologies AG, Neubiberg (DE)

( * ) Notice: Subject to any disclaimer, the term of this patent is extended or adjusted under 35 U.S.C. 154(b) by 1160 days.

(21) Appl. No.: 12/103,159

(22) Filed: Apr. 15, 2008

(65) Prior Publication Data

US 2009/0256361 A1    Oct. 15, 2009

(51) Int. Cl.
| F02B 63/04 | (2006.01) |
| F03G 7/08 | (2006.01) |
| H02K 7/18 | (2006.01) |
| B60C 19/00 | (2006.01) |
| B60C 23/04 | (2006.01) |
| E01C 23/00 | (2006.01) |

(52) U.S. Cl.
CPC .............. *H02K 7/1846* (2013.01); *B60C 19/00* (2013.01); *B60C 2019/005* (2013.04); *B60C 23/041* (2013.01); *B60C 23/0413* (2013.01)
USPC .............................. 290/1 R; 73/146; 342/173

(58) Field of Classification Search
USPC .............................. 290/1 R; 342/173; 73/146
See application file for complete search history.

(56) References Cited

U.S. PATENT DOCUMENTS

| 3,699,367 | A | * | 10/1972 | Thomas | 310/69 |
| 3,760,351 | A | * | 9/1973 | Thomas | 340/443 |
| 4,300,119 | A | * | 11/1981 | Wiernicki | 340/447 |
| 4,405,872 | A | * | 9/1983 | Thomas | 310/75 R |
| 4,539,496 | A | * | 9/1985 | Thomas et al. | 310/68 B |
| 4,602,173 | A | * | 7/1986 | Briscoe et al. | 310/1 |
| 4,911,217 | A | * | 3/1990 | Dunn et al. | 152/152.1 |
| 5,181,975 | A | * | 1/1993 | Pollack et al. | 152/152.1 |
| 5,578,877 | A | * | 11/1996 | Tiemann | 310/15 |
| 5,749,984 | A | * | 5/1998 | Frey et al. | 152/415 |
| 6,291,901 | B1 | * | 9/2001 | Cefo | 290/1 R |
| 6,470,933 | B1 | * | 10/2002 | Volpi | 152/152.1 |
| 6,885,111 | B2 | * | 4/2005 | Volpi | 290/1 R |
| 7,009,310 | B2 | * | 3/2006 | Cheung et al. | 290/1 R |
| 7,126,233 | B2 | * | 10/2006 | Thomas et al. | 290/1 R |
| 7,285,868 | B2 | * | 10/2007 | Wilson | 290/1 R |
| 7,343,787 | B2 | * | 3/2008 | Oflaz | 73/146 |
| 7,432,851 | B2 | * | 10/2008 | Dulac | 342/173 |
| 7,495,352 | B2 | * | 2/2009 | Perlo et al. | 290/1 R |
| 7,508,085 | B2 | * | 3/2009 | Martineau | 290/1 R |
| 7,687,943 | B2 | * | 3/2010 | Lunde | 310/15 |
| 7,814,781 | B2 | * | 10/2010 | Jongsma et al. | 73/146 |
| 8,234,918 | B2 | * | 8/2012 | Jongsma et al. | 73/146 |
| 8,616,049 | B2 | * | 12/2013 | Jongsma et al. | 73/146 |
| 2004/0100100 | A1 | * | 5/2004 | Wilson | 290/1 R |
| 2005/0017602 | A1 | | 1/2005 | Arms et al. | 310/339 |

(Continued)

FOREIGN PATENT DOCUMENTS

| DE | 10253722 | | 6/2004 |
| JP | 8310207 | A | 11/1996 |
| WO | 2007121265 | | 10/2007 |

*Primary Examiner* — Pedro J Cuevas
(74) *Attorney, Agent, or Firm* — Dicke, Billig & Czaja, PLLC

(57) ABSTRACT

An energy harvesting system and method includes a rotatable member with an electrically conductive coil mounted to the rotatable member and adapted to move with the rotatable member such that the movement of the coil through a magnetic field induces a voltage in the coil. An energy storage device is coupled to the coil.

16 Claims, 3 Drawing Sheets

(56) References Cited

U.S. PATENT DOCUMENTS

| | | | |
|---|---|---|---|
| 2005/0151375 A1* | 7/2005 | Cheung et al. | 290/1 R |
| 2005/0257609 A1* | 11/2005 | Mancosu et al. | 73/146 |
| 2006/0132356 A1* | 6/2006 | Dulac | 342/173 |
| 2006/0243043 A1* | 11/2006 | Breed | 73/146 |
| 2006/0260390 A1* | 11/2006 | Oflaz | 73/146 |
| 2007/0187952 A1* | 8/2007 | Perlo et al. | 290/1 R |
| 2007/0205880 A1 | 9/2007 | Hattori et al. | 340/442 |
| 2008/0289407 A1* | 11/2008 | Gramling et al. | 73/146.5 |
| 2009/0134632 A1* | 5/2009 | Kvisteroy et al. | 290/1 R |
| 2010/0300191 A1* | 12/2010 | Jongsma et al. | 73/146 |
| 2011/0011172 A1* | 1/2011 | Schreiner et al. | 73/146.3 |
| 2011/0159817 A1* | 6/2011 | Sabatini et al. | 455/66.1 |
| 2012/0176125 A1* | 7/2012 | Lee et al. | 324/207.25 |
| 2012/0211997 A1* | 8/2012 | Bonisoli et al. | 290/1 R |
| 2013/0025751 A1* | 1/2013 | Dassano et al. | 152/151 |

\* cited by examiner

ENERGY HARVESTER

BACKGROUND

The production of electrical energy from electrical energy from the surroundings without utilizing a utilization of a battery is a form of energy harvesting. Energy harvesting also known as power harvesting or energy scavenging is a process by which energy is captured and stored. Energy harvesting makes it possible to drive electrical systems without the necessity of battery or a more restrictive accumulator. Energy harvesting systems conventionally use thermal electricity or mechanical vibrations which are converted to electric energy.

Some electrical generating systems make use of reciprocating magnet movement through one or more coils. The movement of a magnet through a conductive coil induces a current flow in the coil. The coupling of the mechanical energy through an inert mass is usually done by means of a mechanical feather or spring. If the magnet is moved back and forth in a reciprocating motion, the direction of current flow in the coil will be reversed for each successive traverse, yielding an AC current.

Another form of energy harvesting systems is provided for harvesting energy from the environment or other remote surfaces and converting it electrical energy. This type of harvester relies on another source of the magnetic field or the earth's magnetic field that is external to the harvester. The harvester in this case does not contain a permanent magnetic or other local magnetic field source. Harvesters of this type may be smaller and lighter than an energy harvester that contains the magnet. Additionally, by having an external magnetic field they do not require vibrational energy.

For these and other reasons, there is a need for the present invention.

SUMMARY

An energy harvesting system in accordance with disclosed embodiments includes a rotatable member with an electrically conductive coil mounted to the rotatable member and adapted to move with the rotatable member such that the movement of the coil through a magnetic field induces a voltage in the coil. An energy storage device is coupled to the coil.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
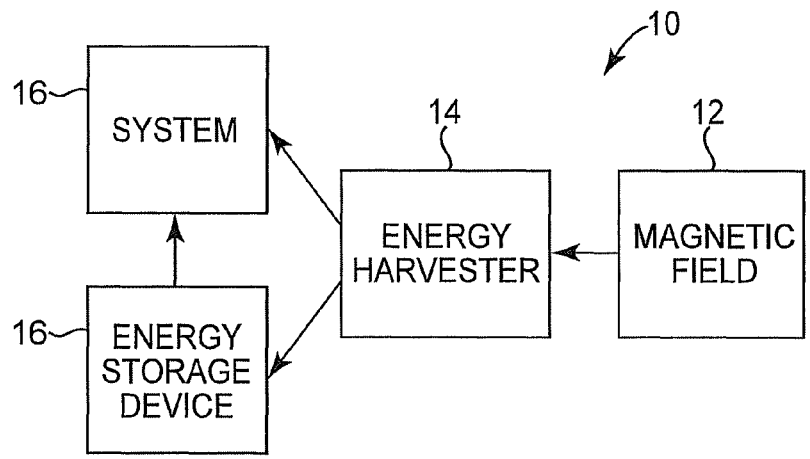
FIG. 1A is a block diagram conceptually illustrating an embodiment of an energy harvesting system.
Figure 1B:
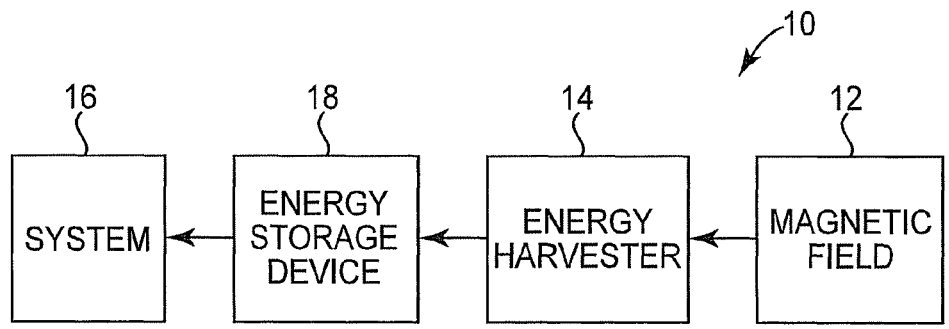
FIG. 1B is a block diagram conceptually illustrating an embodiment of an energy harvesting system.
Figure 1C:
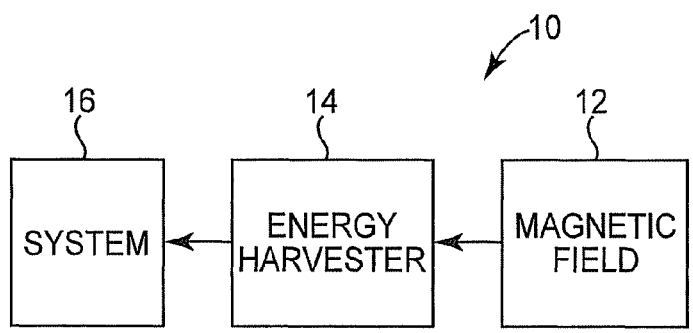
FIG. 1C is a block diagram conceptually illustrating an embodiment of an energy harvesting system.

FIGS. 1A-1C are block diagrams illustrating aspects of an energy harvesting system in accordance with embodiments of the invention. The system for which energy is supplied may be any device which requires energy and is subject to some degree of movement and rotation, for example, a tire sensor mounted inside a tire. The disclosed energy harvester may be applicable in situations where it is not easy to access other types of power, although its application can be anywhere energy harvesting is sought. The energy harvester provides for conversion of magnetic energy to electrical energy.

FIG. 1A is a block diagram illustrating an implementation of an energy harvesting system 10 in accordance with embodiments of the invention. FIG. 1A illustrates a magnetic field 12, such as the Earth's magnetic field, applied to an energy harvester 14. Electrical energy generated by the energy harvester may be applied to an electronic device or system 16 to be powered and/or an energy storage device 18. The energy harvester 14 provides electrical energy to the system 16 such as a tire pressure gauge mounted to a tire, for example. The energy storage device 18 stores the electrical energy generated by the energy harvester 14. The energy storage device 14 may be a capacitor or battery, for example. The energy storage device 18 stores energy for future use by the system 16.

FIGS. 1B and 1C illustrate further embodiments. In FIG. 1B, the energy harvester 14 is connected to the energy storage device 18, which supplies power to the system 16. FIG. 1C illustrates a diagrammatic representation of an energy harvesting system according to another embodiment. An outside magnetic field source is applied to the energy harvester. Electrical energy generated is then sent to the system for use.

Figure 2:
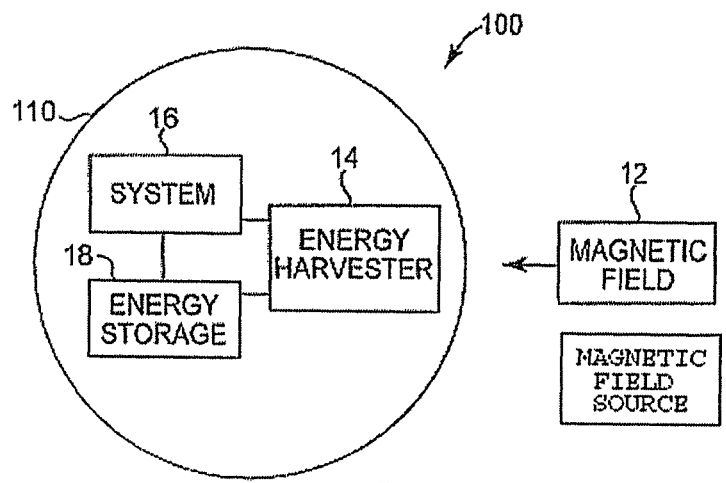
FIG. 2 is a block diagram conceptually illustrating aspects an embodiment of a tire system including an energy harvesting device.

FIG. 2 is a block diagram illustrating an energy harvesting system, similar to that illustrated in FIGS. 1A-1C, where the energy harvesting system is implemented with a tire. Many different types of wheeled vehicles use pneumatic tires (in this specification, the term tire generally refers to a pneumatic tire). Typically, a tire is mounted on the rim of a wheel, which is mounted to a vehicle.

Sensor devices exist for providing information about the tires of a wheeled vehicle. Features such as automatic stability and traction control in cars have made it necessary to obtain information about the interaction between the tires and the road surface. Such information is available from several sources, including ABS sensors, tire pressure measurement systems, and accelerometers and gyros located in the vehicle. Such sensors require an energy source to power the device, which is typically a battery. Eliminating the battery as the energy source for tire-mounted sensors, or providing an energy source for charging the battery is desirable from cost, reliability and environmental standpoints.

FIG. 2 conceptually illustrates the system 100 implemented with a tire 110. The magnetic field 12 is applied to the tire system 110 inclusive of the energy harvester 14. Energy generated by the tire's energy harvester 14 is supplied to an energy storage device 18 and/or the system 16 being powered, such as a tire sensor device. As illustrated in FIGS. 1A-1C, the harvested energy can be applied both the storage device 18 and powered system 16, serially to the energy storage device 18 and then to the system 16, or applied directly to the system 16, for example.

Figure 3:
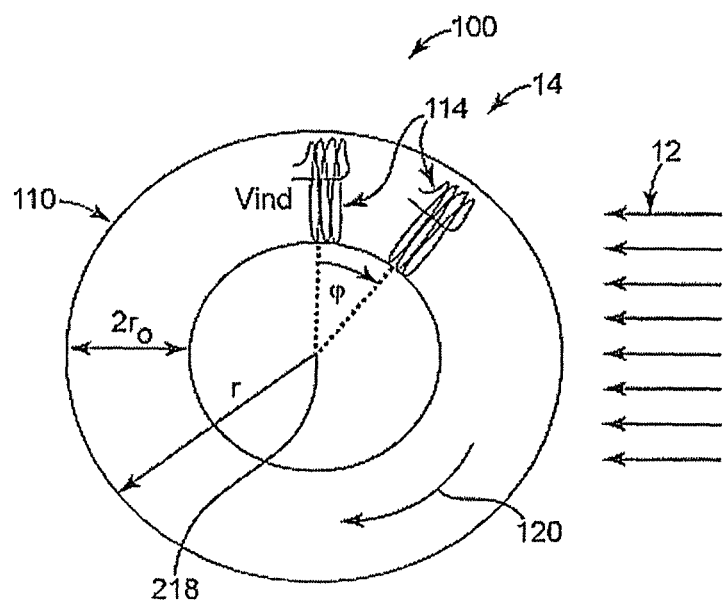
FIG. 3 is diagrammatic representation illustrating aspects an embodiment of a tire system including an energy harvesting device.

FIG. 3 illustrates further aspects of an embodiment of the system 100. Energy harvester 14 includes an electrically conductive coil 114 situated inside the tire 110. The coil 114 is connected to the system to be powered 16 (such as a tire sensor) and/or an energy storage device 18 as illustrated in FIGS. 1 and 2. The tire 110 containing the electrically conductive coils 114 rotates as indicated by the arrow 120.

As the tire 110 rotates relative to the magnetic field source 12, which is the earth's magnetic field or other suitable magnetic field source, the coil 114 cuts through the magnetic field 12 as the orientation of coil 114 changes from vertical to horizontal and horizontal to vertical, inducing an electrical current in the coil 114. The magnetic flux $\Phi$ created as the tire rotates can be calculated by $$\Phi = BA$$

where B is the strength of the magnetic field 12 and A is the cross-sectional area defined by the coil 114. As the tire 110 rotates, the cross-sectional area A as a function of time is $$A = nr_o^2 \cos\phi = A_o \cos\omega t$$

where $r_o$ is the radius of the coil 114 (which is about equal to the cross-sectional radius of the tire 110 depending on the manner in which the coil 114 is mounted to the tire 110), $\phi$ is the change in angular position of the coil 114, and $\omega$ is the angular velocity of the tire. The driving speed v of the tire 110 having a radius r is $$v = \omega r$$

and thus, the induced voltage $V_{ind}$ as a function of time is $$V_{ind} = -nd/dt\Phi$$
$$= -nBd/dtA(t)$$
$$= nBA_o v/r \sin(tv/r)$$

where n is the number of turns in the coil 114. For example, if the Earth's magnetic field is estimated at 30 μT and the following values are assumed:
$r_o$=0.1 m
r=0.2 m
v=60 km/h≈20 m/s
n=100 turns a voltage having an amplitude of about 100 mV with a frequency of 100 Hz is induced. The energy generated in this manner is supplied to the energy storage device 18 and/or directly to the system 16.

The conductive coil 114 can be mounted on the inside surface of the tire 110, or even embedded into the material of the tire 110. In the embodiment illustrated in FIG. 3, the coil 114 defines an axis that is generally parallel to a line tangent to the tire 110—the coil 114 is generally coaxial with the cross-section of the tire 110. The coil 114 includes a predetermined number of turns based on the particular device or system 16 to be powered.

Figure 4:
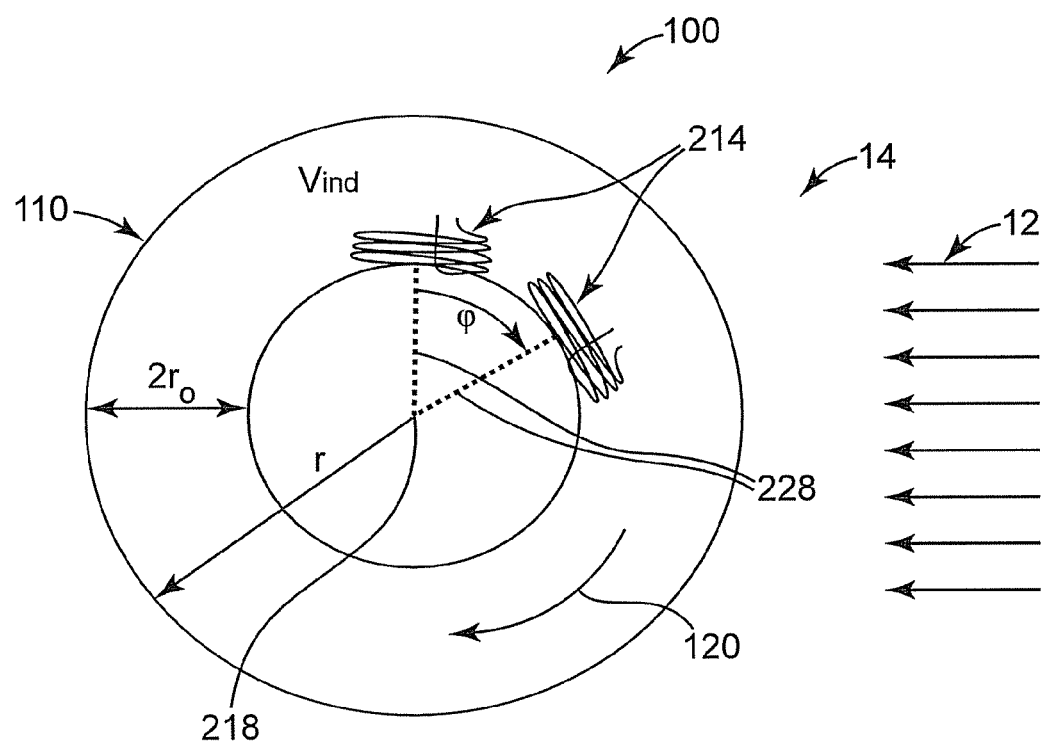
FIG. 4 is a diagrammatic representation illustrating aspects an embodiment of a tire system including an energy harvesting device.

FIG. 4 is another embodiment of a tire system 100 including an energy harvesting device 14, similar to FIG. 3. In this embodiment, the energy harvester 14 includes an electrically conductive coil 214 with an axis 228 generally radial to an axis of rotation 218 of the tire 110. The tire 110, containing the coils 214, rotates as indicated by the arrow 120, relative to the magnetic force 12. The induced voltage $V_{ind}$ is a function of time, as previously described and illustrate with reference to FIG. 3.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An energy harvesting system, comprising:
    a rotatable member;
    an electrically conductive coil mounted to the rotatable member and adapted to move with the rotatable member such that the movement of the coil through a magnetic field induces a voltage in the coil, wherein the magnetic field is generated from a magnetic field source outside of the rotatable member;
    an energy storage device coupled to the coil and configured to receive and store energy from the coil; and
    an electronic device configured to receive energy from the coil and the energy storage device.

2. The energy harvesting device of claim 1, wherein the coil has a predetermined number of turns based on the electronic device to receive energy.

3. The energy harvesting device of claim 1, wherein the rotatable member is a tire.

4. The energy harvesting device of claim 3, wherein the coil is embedded in the material of the tire.

5. The energy harvesting device of claim 3, wherein the coil defines an axis generally parallel to a line tangent to the tire.

6. The energy harvesting device of claim 3, wherein the coil defines an axis generally radial to an axis of rotation of the tire.

7. The energy harvesting device of claim 1, wherein the energy storage device includes a capacitor.

8. The energy harvesting device of claim 1, wherein the energy storage device includes a battery.

9. The energy harvesting device of claim 3, further comprising a sensor mounted to the tire, wherein the sensor is connected to the conductive coil.

10. The energy harvesting device of claim 3, further comprising a sensor mounted to the tire, wherein the sensor is connected to the energy storage device.

11. A method of producing an energy harvester, comprising:
   providing a tire,
   mounting a conductive coil inside the tire;
   connecting the coil to a sensor to power the sensor; and
   connecting the coil to an energy storage device inside the tire to store the energy generated in the coil.

12. The method of claim 11, wherein connecting the coil to the energy storage device includes connecting the coil to a capacitor.

13. The method of claim 11, wherein connecting the coil to the energy storage device includes connecting the coil to a battery.

14. The method of claim 11, wherein mounting the coil includes embedding the coil in material of the tire.

15. The method according to claim 11, further comprising mounting the sensor to the tire.

16. A tire system, comprising:
   a tire;
   an electrically conductive coil mounted to the tire and adapted to move with the tire such that the movement of the coil through a magnetic field induces a voltage in the coil, wherein the coil defines an axis generally radial to an axis of rotation of the tire, and wherein the magnetic field is generated from a magnetic field source outside of the tire;
   an energy storage device coupled to the coil and configured to receive and store energy from the coil; and
   a sensor mounted to the tire, wherein the sensor is coupled to the coil to receive power from the coil and the energy storage device, wherein the received power energizes the sensor,
   wherein the coil has a predetermined number of turns based on the sensor to receive power.

* * * * *